(12) United States Patent
Deshpande et al.

(10) Patent No.: US 7,752,162 B2
(45) Date of Patent: Jul. 6, 2010

(54) ANALYSIS OF OLAP DATA TO DETERMINE USER-RELEVANT INFORMATION

(75) Inventors: Prasad Manikarao Deshpande, Mumbai (IN); Krishna Kummamuru, Hyderabad (IN); Guruduth Somasekhara Banavar, Pelham Manor, NY (US); Vijii Enara Chenthamarakshan, Kerala (IN)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 11/421,864

(22) Filed: Jun. 2, 2006

(65) Prior Publication Data

US 2007/0282789 A1 Dec. 6, 2007

(51) Int. Cl.
*G06F 7/00* (2006.01)
(52) U.S. Cl. .................................... 707/600; 707/602
(58) Field of Classification Search .................. 707/1, 707/100, 600, 602; 705/7
See application file for complete search history.

(56) References Cited

U.S. PATENT DOCUMENTS

| 6,587,547 | B1 * | 7/2003 | Zirngibl et al. | 379/88.17 |
|---|---|---|---|---|
| 6,609,108 | B1 * | 8/2003 | Pulliam et al. | 705/27 |
| 6,765,997 | B1 * | 7/2004 | Zirngibl et al. | 379/88.18 |
| 6,901,430 | B1 * | 5/2005 | Smith | 709/206 |
| 2002/0099581 | A1 | 7/2002 | Chu et al. | |
| 2003/0217061 | A1 * | 11/2003 | Agassi et al. | 707/10 |
| 2004/0003097 | A1 * | 1/2004 | Willis et al. | 709/228 |
| 2004/0093261 | A1 * | 5/2004 | Jain et al. | 705/10 |
| 2005/0038768 | A1 * | 2/2005 | Morris | 707/1 |
| 2005/0086239 | A1 * | 4/2005 | Swann et al. | 707/100 |
| 2005/0246357 | A1 * | 11/2005 | Geary et al. | 707/100 |
| 2006/0074833 | A1 * | 4/2006 | Gardner et al. | 706/45 |

OTHER PUBLICATIONS

Nigel Pendse, "The origins of today's OLAP products", The OLAP Report, pp. 1-8.*
Unknown Author, "Online Analytical Processing (OLAP)", Wikipedia.com, pp. 1-6.*
Sarawagi, Sunita; Agrawal, Rakesh; and Megiddo, Nimrod; "*Discovery-driven exploration of OLAP data cubes*"; In Proc. of the 6th Int'l Conference on Extending Database Technology (EDBT), Valencia, Spain, 1998.
Sathe, Gayatri; Sarawagi, Sunita; "*Intelligent Rollups in Multidimensional OLAP Data*", VLDB 2001: 531-540.

(Continued)

*Primary Examiner*—Mohammad Ali
*Assistant Examiner*—John P Hocker
(74) *Attorney, Agent, or Firm*—Gibb I.P. Law Firm, LLC

(57) ABSTRACT

The analysis of OLAP data to determine user-relevant information firstly generates a set of queries based on said preferences. Each query is evaluated sequentially against the OLAP data to give a query result. For each evaluated query in turn, it is determined whether said result is relevant to the user on the basis of conditions derived from the user preferences. An output results set is formed consisting of the relevant results. Further, if a previous query result containing a common measure was determined not to be relevant, then a subsequent query can be omitted from evaluation.

10 Claims, 4 Drawing Sheets

OTHER PUBLICATIONS

Sarawagi, Sunita; "*User-cognizant multidimensional analysis*"; VLDB J; 10(2-3): 224-239; (2001).

Sarawagi, Sunita; Gayatri; Sarawagi; i³; "*Intelligent, Interactive Investigaton of OLAP data cubes*"; SIGMOD Conference 2000: 589.

Sarawagi, Sunita; "*User-Adaptive Exploration of Multidimensional Data*"; VLDB 2000: 307-316.

NG, R et al.; "*Exploratory Mining and Pruning Optimizations of Constrained Associations Rules*"; Proc. 1998 ACM SIGMOD Int'l Conf. Management of Data; ACM Press; New York; 1998; pp. 13-24.

Chaudhuri, S and Dayal, U; "*An Overview of Data Warehousing and OLAP Technology*"; ACM SIGMOD Record, Jun. 1997; pp. 65-74.

\* cited by examiner

50

60

ANALYSIS OF OLAP DATA TO DETERMINE USER-RELEVANT INFORMATION

FIELD OF THE INVENTION

The present invention relates to the analysis of multi-dimensional OLAP data, particularly to determine information of relevance to a user from such data.

BACKGROUND

In many businesses, data is collected as part of day-to-day operations. Trends and facts can be extracted from this data to give many meaningful insights into a business's performance in relation to goods or services it provides, or, more generally, for the purposes of operational research.

One known paradigm for the analysis of data is the on-line analytical processing (OLAP) model (see for example S. Chaudhari and U. Dayal, *An Overview of Data Warehousing and OLAP Technology*, ACM SIGMOD Record, June 1997, pp. 65-74). OLAP software applications allow the collection, storage, manipulation and reproduction of multi-dimensional data. By analysing data along the various dimensions and looking at the measures of interest, one can discover interesting correlations. The process of discovering items of interest is interactive in nature, requiring user input and manual analysis. The manual aspect of the analysis suffers from the problem of being time consuming and tedious, in that a number of queries need to be conducted to arrive at the information of interest, and furthermore, insights may be overlooked due to a particular query being skipped by the user.

OLAP queries aggregate measures in data in various ways at different levels of the dimensional hierarchy. A Graphical User Interface approach has been used to represent the hierarchical data in the form of data cubes. The user is able to enter cubes and navigate in conducting an analysis to locate interesting parts within the data (see for example Sarawagi et al., *Discovery-driven Exploration of OLAP data cubes*, in Proc. of the 6th International Conference on Extending Database Technology (EDBT), Valencia, Spain, 1998).

Earlier approaches have focused on providing tools and methods for a user to identify significant information. The user still has to play an active role and navigate the data cube using the tools.

SUMMARY

The analysis of OLAP data to determine user-relevant information firstly generates a set of queries based on said preferences. Each query is evaluated sequentially against the OLAP data to give a query result. For each evaluated query in turn, it is determined whether said result is relevant to the user on the basis of conditions derived from the user preferences. An output results set is formed consisting of the relevant results.

Further, if a previous query result containing a common measure was determined not to be relevant, then a subsequent query can be omitted from evaluation.

BRIEF DESCRIPTION OF THE DRAWINGS

Aspects of the present invention will now be described, by way of example only, with reference to the accompanying drawings, in which.

DETAILED DESCRIPTION

Figure 1:
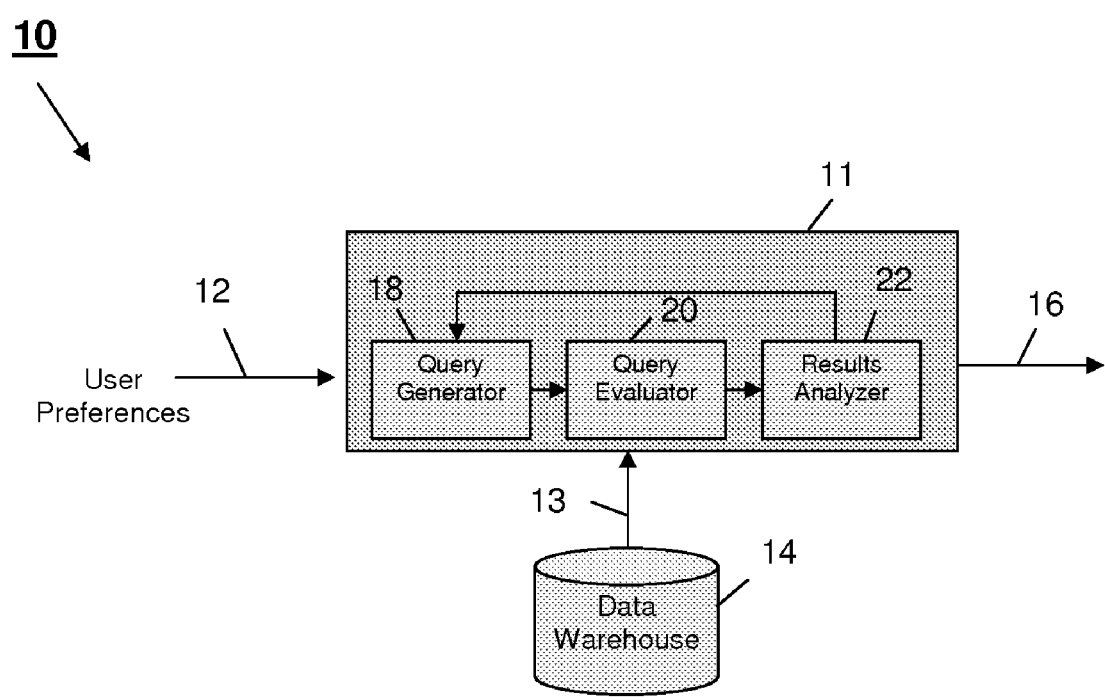
FIG. 1 is a schematic representation of an information extractor module system.

Where reference is made in any one or more of the accompanying drawings to steps and/or features, which have the same reference numerals, those steps and/or features have for the purposes of this description the same function(s) or operation(s), unless the contrary intention appears.

In this specification, the terms 'relevant' and 'relevance' are used in the most general sense to cover ideas such as trends, facts, significance, highlights, correlations, interest, and so on.

Introduction of the Example

For the purposes of illustration, consider the example and embodiment of a ticketing system, and data therefor having attributes including:

1. Problem Type
2. Open Time
3. Close Time
4. Status
5. Severity
6. Customer
7. Resolver
8. Description
9. Product In the sense of an OLAP approach, the data attributes of Problem Type, Severity, Status, Customer, Resolver, Time, and Product can be considered as dimensions. The data attributes of Count, and TimeToFix (i.e. Close Time-Open Time) can be considered as measures. There also is a hierarchy in the Time dimension and in the Product dimension. These allocations are shown in Table 1.

TABLE 1

| Dimensions | Measures |
| --- | --- |
| Customer | Count |
| Month → Quarter | TimeToFix |
| Product → Product Family | |
| Problem Type | |
| Resolver | |
| Severity | |
| Status | |

Managers of IT systems will run various reports on such data to keep track of the current state of affairs. Example reports can be:

1. Show the number of open tickets by severity for different months for a particular customer
2. Show the average time taken for fixing severity 1 tickets for different customers by different resolvers.

Architecture Overview

Turning to FIG. 1, an Extractor Module system architecture 10 is shown. An Extractor Module 11 receives one or more input user preferences 12, and attribute data 13 from a data warehouse 14. This information is processed by the module 10 to generate output 'information of relevance' 16. Information that is of relevance to one person may not be of relevance to another. The 'relevance' aspect is captured by way of the user preferences 12.

Figure 2:
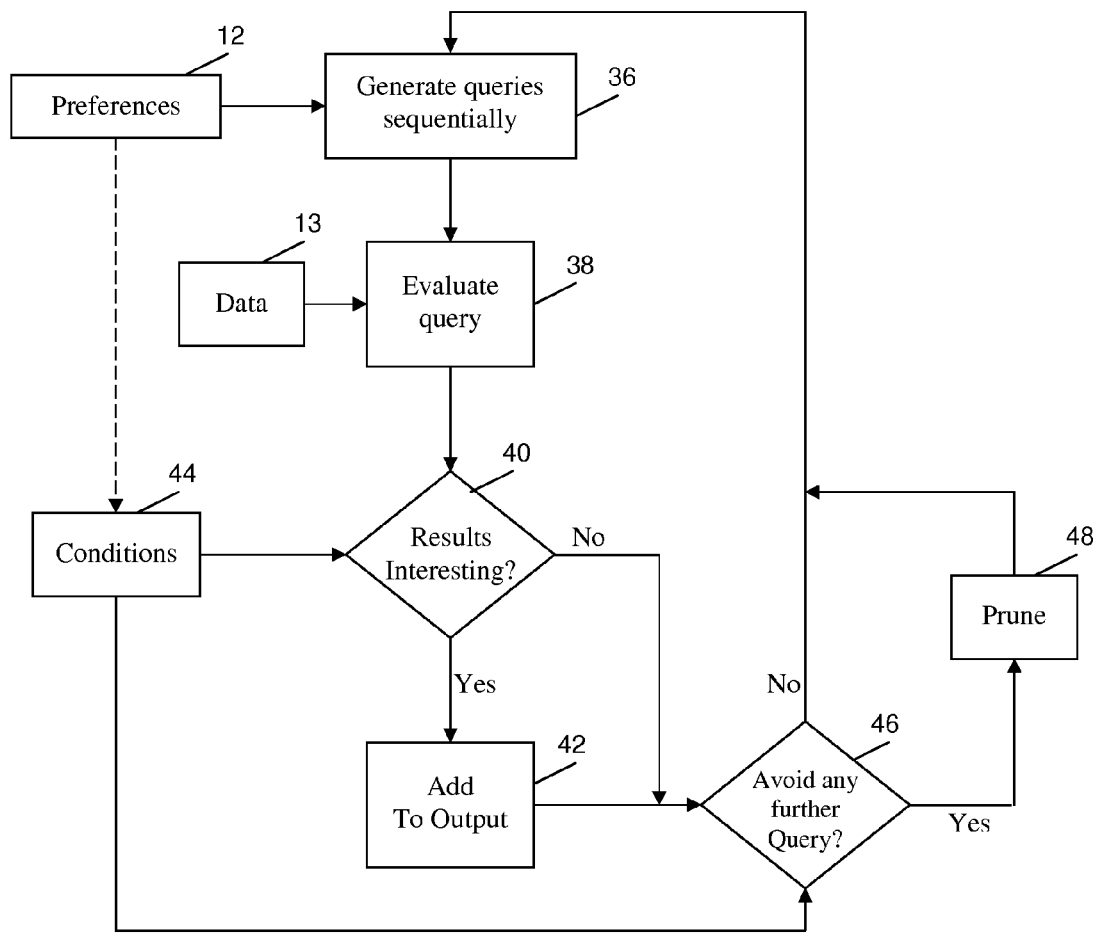
FIG. 2 is a flow diagram representation of an information extraction process according to an embodiment of the invention.

The flowchart of FIG. 2 shows the overall process 30 performed by the extractor module 10. The relevant user preferences 12 are fetched. In step 36, the corresponding queries are sequentially generated. Each query is then evaluated against the data 13 in step 38. The results of the query are checked in step 40 to see if they are interesting. This check is done by applying the user-defined conditions 44 that are part of the user preferences 12 to query the results. If the results are interesting (i.e. "Yes"), they are added to the subset of results output to the user in step 42. The results of the query are then analysed in step 46 to determine if any further query can be omitted. This is determined based on the conditions 44, as will be described later. If another query can be omitted (i.e. "Yes"), then it is pruned out and not performed when the next query generation occurs (i.e. when steps 36 and 38 are repeated), else (i.e. "No") the query in question must be performed.

Preferences

There are various factors that contribute to what is relevant to the user. These factors are captured in terms of user preferences using a specification language. Some of these factors are listed below with reference to the example data model shown in Table 1:

1. Dimensions and levels—the user may only be interested in certain dimensions at certain levels of aggregation (e.g.: Severity, Product)
2. Measures—what measures are of interest (e.g.: Count)
3. Dimension values—specific dimension values that may be of interest (e.g.: All severity 1 problems only)
4. Thresholds for outliers—what outliers are considered interesting (e.g.: Count in the top 10%)
5. Statistical conditions for the measures that are interesting (e.g.: Count>5)
6. Trends—when is a trend interesting (A trend is the analysis of measures and dimensions over an ordered dimension such as time; e.g.: the number of new problem tickets with severity 1 and 2 in this week is twice that of last week.)
7. Comparative—if the aim is to compare across dimension values, then specify condition that make the comparison interesting. This covers the case where there is no implicit order on the dimension and we want to compare across values. (E.g.: Count(Cust1)>Count(Cust2) identifies points where the problem ticket count for Cust1 is greater than that of Cust2).

User Preferences Specification Language

The user preferences are stored in the extractor module 10 using a user preference specification language. An example embodiment of the specification language for representing user preferences is listed below. The grammar for the specification language uses Extended Backus-Naur Form (EBNF) notation.

1. UserPrefs:=Pref*
2. Pref:=<GBSpec, (Measure+), (NonGBDimSelSpec*), (Condition?), (DrilldownSpec?)>
3. GBSpec:=Cube(CubeDimSpec+)|GB(GBDimSpec+)
4. CubeDimSpec:=Dim|Dim(Val+)|(Dim, Level)|(Dim (Val+), Level)
5. GBDimSpec:=Dim|Dim(Val+)
6. NonGBDimSelSpec:=Dim(Val+)
7. DrillDownSpec:=Drill down (Dim+) if Condition Rule 1 states that a user's preference can be a collection of several preferences. Rule 2 states that each preference includes a way to subset the dimensions, the measures, the conditions on the measures and a drill down specification. Rule 3 states that the dimensions can be restricted in two ways. The first construct, called Cube, is used when all possible combinations of a set of dimensions is to be considered. The second construct, called GB, is used when only a particular combination of dimensions is to be considered. Rule 4 and Rule 5 state that a dimension can be either unrestricted or restricted to certain values and levels. Rule 6 specifies the selection condition for the non group-by dimensions. Rule 7 states that the drill down specification consists of the dimensions to drill down on and the condition on which the drill down should be performed.

The Condition can be any Boolean condition on the measures. Further constructs that can be used in the Condition specification for expressing various constraints are as follows:

1. Top(Measure, Dim+, n): is true if the measure value is within the top 'n' values for the specified dimensions.
2. Bottom(Measure, Dim+, n)
3. TopPercentile(Measure, Dim+, p): is true if the measure value is within the top 'p' percentile for the specified dimensions
4. BottomPercentile(Measure, Dim+, p)
5. Outlier(Measure, Dim, p): is true if the measure value is at least 'p' distance away from the curve that fits the measure values for the specified dimension. Only ordered dimensions such as Time are allowed in this construct. A polynomial least squares method is used to fit a curve to the observed measures in our embodiment. But in principle, other curve fitting methods equally could be used.
6. Mean(Measure, Dim+): computes the mean of the measure values for the specified dimensions
7. Variance(Measure, Dim+): computes the variance of the measure values for the specified dimensions The examples of preferences, listed below, will aid understanding of the specification language:

1. <GB(Severity), (Count), ( ), ( ), ( )>: The user is interested in the count of problem tickets over the severity dimension.
2. <GB(Severity, Problem Type), (Count), ( ), ( ), ( )>: This shows that the user is interested in the count of problem tickets over the dimensions of severity and problem type.
3. <Cube(Severity, Problem Type), (Count), ( ), ( ), ( )>: The user is interested in all possible aggregations over the dimensions Severity and Problem Type. These include count of problem tickets by (Severity, Problem Type), by Severity, by Problem Type and the total count. This is similar to the standard Cube operator in OLAP.
4. <GB(Severity(Sev1, Sev2), Problem Type), (Count), (Month(Jan)), ( ), ( )>: This shows that the user is interested in the count of problem tickets over the dimensions of severity and problem type. He is interested only in Sev1 and Sev2 problems in the month of Jan.
5. <GB(Severity, Problem Type), (Count), ( ), (Count>5), ( )>: This shows that the user is interested in the count of problem tickets over the dimensions of severity and problem type and only in those cells where the count is greater than 5.
6. <GB(Severity, Problem Type), (Count), ( ), (Top(Count, Severity, 3)), ( )>: This shows that the user is interested in the count of problem tickets over the dimensions of severity and problem type and only in the top 3 severity values for each Problem Type.

7. <GB(Severity), (Count), ( ), ( ), (Drill down Problem Type if Count>50)>: The user is interested in the count of problem tickets over the severity dimension and is further interested in drilling down on the Problem Type for severity values having a problem count greater than 50.

Gathering User Preferences

There are two ways to specify user preferences. In the first option, the user directly specifies their preference to the extractor module 10 (i.e. as shown in FIG. 1). In the second option, the user's preferences are learnt automatically by the extractor module 10.

In this learning mode, the module 10 monitors queries being run by the user. The learning is achieved through the following steps:

1. Gather statistics about the various queries run by the user.
2. Analyze the statistics to determine how often each dimension and measure is accessed by the user
3. As different queries are executed, the user can tag certain queries and results as interesting. When the user tags a result as interesting, the system will popup a screen where the user can enter the condition that makes the result interesting
4. When the user drills down on a particular dimension, the system will popup a screen where the user can enter the condition that caused the user to drill down.
5. Based on these inputs the system gathers information about the dimensions and measures of interest to the user and also what are the conditions under which the results are interesting. These are represented in the user preferences specification language.
6. The user can then edit the preferences to further customize them.

Query Generator

The query generator 18 within the extractor module 10 sequentially generates queries to be run against the data from the data warehouse 14 using the user preferences 12.

Let the hierarchy sizes on these dimensions be $h_1, h_2 \ldots h_n$. The number of possible levels of aggregation for the data is $(1+h_1)*(1+h_2) \ldots *(1+h_n)$. There is a combinatorial explosion in the number of queries. Adding selection conditions on the dimension values further increases the number of possible queries. For example, there might be a relevant trend in the number of problem tickets for customer A, but no such trend might exist if all the customers are considered together. Adding a selection condition 'Customer=A' for the queries involving the customer dimension will bring out this trend.

To tackle this 'blowup' in the number of queries, the Query Generator 18 intelligently 'prunes' the set of queries that need to be run. The pruning is based on the user preferences 12. In that sense, the Query Generator 18 generates only those queries relevant to the user. The subsequent queries thus are restricted by the Query Generator 18 to be run based on the dimensions, levels, measures and dimension values that are of interest as specified in the user preferences. For example, if there is no interest in the Product dimension, then there is no need to analyze by that dimension. Similarly, the level to which queries are run along each dimension can be restricted. For example, the user might be interested only in daily or monthly trends and not down to an hourly level.

Queries will be generated for each user preference as follows:

<GB(GBDimSpec+), (Measure+), (NonGBDimSelSpec*), (Condition?), (DrilldownSpec?)> will result in a single initial query based on the dimensions, measures and conditions specified. Further drill-down queries are optionally generated if the drill down condition is satisfied.

<Cube(CubeDimSpec+), (Measure+), (NonGBDimSelSpec*), (Condition?), (DrilldownSpec?)> will result in a set of queries, one for each combination of cube dimensions. Queries are generated only to the levels specified in the CubeDimSpec.

Query Evaluator

The query evaluator 20 issues the query to the underlying data warehouse 14 and fetches the results 13.

Results Analyser

By ordering the execution of queries and looking at the results of the queries, further queries can be 'pruned'. For example, consider the case where the user is interested in finding out areas that have a high number of problem tickets. By executing queries at higher level of aggregation and selectively drilling down the number of queries can be reduced. If the number of problem tickets for customer A is very small, there is no need to further drill down along the product or severity dimensions for that customer, since the number of tickets is only going to reduce on drill down (due to monotonic property of the Sum operator).

There are two cases in which queries get pruned based on query results:

Cube specifications: For cube specifications, multiple queries need to be run, starting from the highest level of aggregation. If the measure is monotonic, it may be possible to prune out queries at lower level of aggregations based on the results as explained above.

Drill down specifications: The drill down condition leads to pruning of drill down queries. Drill down can be skipped for results that don't satisfy the drill down condition.

The pruning by query results is achieved by having a feedback loop 24 from the results analyzer 22 to the query generator 18. If a particular path of analysis does not generate interesting results (i.e. it does not match user preferences), then the analyzer 22 informs such to the query generator 18, which will prune out the remaining queries on that path.

One way to implement results based pruning analysis is by building a dependency graph of queries. An edge in the graph from query Qi to Qj indicates labeled with a condition C indicates that results of Qj are interesting only for those cells in the results of Qi for whom the condition C holds. There are two ways in which an edge gets added to the graph between Qi and Qj.

1. Qi and Qj are queries generated from the same cube specification, Qi is a higher level aggregate query than Qj and the condition C specified in the cube specification is such that C(Xj) is true only if C(Xi) is true, where Xj is cell in the result of Qj and Xi is the corresponding cell in the result of Qi. Such a dependency structure between queries of a cube has been used previously in literature. (See for example Harinarayan et al., *Implementing data cubes efficiently*, in Proceedings of the 1996 ACM SIGMOD international conference on Management of data, Montreal, Quebec, Canada, 1996.)
2. Qj is a drill down over Qi. In this case C is the drill down condition specified by the user.

Figure 3:
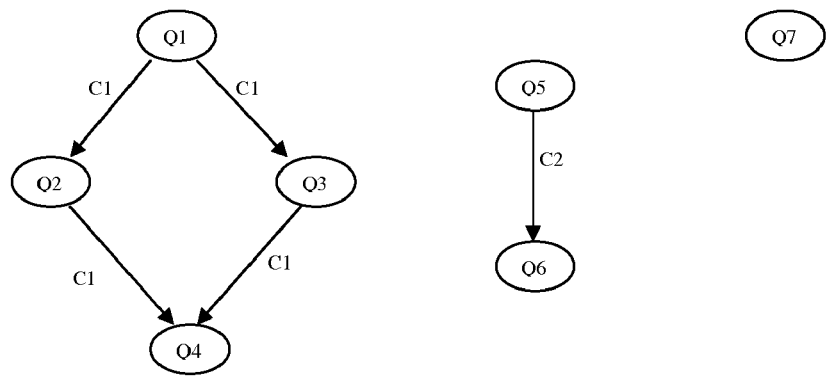
FIG. 3 is a generic dependency graph.

Once the dependency graph is built, the queries are executed in a topological sort order. Taking the example dependency graph 50 of FIG. 3, Q1 is executed before Q2 and Q3, Q2 is executed before Q4 and so on. Q7 can be executed any time since it has no dependency. On executing a query Qi, consider all edges going out from that query. Let there be an edge between Qi and Qj with a condition label C. Evaluate the condition C on the results of the query Qi. The results of Qj will be interesting only for those results in Qi that satisfy C. If there are no results in Qi satisfying the condition C, then Qj can be eliminated and there is no need to evaluate it. For example, in FIG. 3, if none of the results of Q5 satisfy the condition C2, then Q6 can be pruned out.

Information of Relevance

After performing the automated analysis, the extractor module 10 outputs the results 16 to the user. These are results of OLAP-style queries that are interesting to the user. Some examples of highlights in the example data set considered could be:

Number of open tickets for IGA account has increased significantly last week

The top 3 severity 1 problems are A, B and C.

There are two issues to be considered:

Presentation: The results could be presented to the user in multiple ways.

1. The system can either show only the reports and data points of interest based on the conditions specified
2. The system can show the entire report and highlight the data points of interest so that they are immediately visible to the user
3. The system can generate natural language (eg: English) sentences to inform the user about the interesting data points Push vs Pull: There are different ways in which the user can get the highlights. One option is to present the highlights in a portal or other UI when the user logs in. The other option is set up the system to run the automated analysis on a periodic basis. Thus the highlights can be computed and notified to the user automatically rather than the user having to explicitly perform the analysis.

Worked Example

Table 2 shows the data in a 'Problem_Ticket' table. For simplicity, only a subset of the dimensions and measures listed in Table 1 is presented. Table 2 shows the information about the number of open tickets. The TICKETID field uniquely identifies each problem tickets. The SEVERITY field can take three values SEV1, SEV2 and SEV3. The product ID and Product Family is a hierarchy. Product1 belongs to product family FAM1 where as Product2 and Product 3 belongs to product family FAM2.

TABLE 2

| TICKETID | SEVERITY | PRODUCTID | PRODUCTFAMILY | CUST_ID | MONTH |
|---|---|---|---|---|---|
| TID001 | SEV1 | PRODUCT1 | FAM1 | CUST_1 | 3 |
| TID002 | SEV2 | PRODUCT1 | FAM1 | CUST_1 | 3 |
| TID003 | SEV1 | PRODUCT1 | FAM1 | CUST_1 | 3 |
| TID004 | SEV1 | PRODUCT1 | FAM1 | CUST_1 | 3 |
| TID005 | SEV1 | PRODUCT2 | FAM2 | CUST_2 | 3 |
| TID006 | SEV2 | PRODUCT1 | FAM1 | CUST_2 | 3 |
| TID007 | SEV2 | PRODUCT2 | FAM2 | CUST_2 | 3 |
| TID008 | SEV2 | PRODUCT2 | FAM2 | CUST_2 | 2 |
| TID009 | SEV3 | PRODUCT1 | FAM1 | CUST_2 | 2 |
| TID010 | SEV3 | PRODUCT2 | FAM2 | CUST_2 | 2 |
| TID011 | SEV1 | PRODUCT1 | FAM1 | CUST_3 | 2 |
| TID012 | SEV1 | PRODUCT2 | FAM2 | CUST_3 | 2 |
| TID013 | SEV2 | PRODUCT3 | FAM2 | CUST_1 | 2 |
| TID014 | SEV1 | PRODUCT2 | FAM2 | CUST_1 | 3 |
| TID015 | SEV2 | PRODUCT3 | FAM2 | CUST_1 | 3 |

Assume the user queries follow the statistics in Table 3 below:

TABLE 3

| Dimensions | Measure | Condition | Selection | DrillDown | Drilldown Condition | Count |
|---|---|---|---|---|---|---|
| Severity | Count | Count > 5 | Cust 1, Cust 2 | | | 10 |
| Severity, ProductId | Count | Count > 5 | Cust 1, Cust 2 | | | 8 |
| ProductId | Count | Count > 5 | Cust 1, Cust 2 | | | 8 |
| None | Count | Count > 5 | Cust 1, Cust 2 | | | 8 |
| Month, Customer | Count | | Cust 1, Cust 2 | Severity | Count(Month) > 2 * Count(Month − 1) | 7 |

The user is interested in only customers Cust 1 and Cust 2, so the selection condition applies to all the user's queries. Further the user is interested in the Count measure and considers it significant if the problem count is greater than 5. The user does trend analysis on the month dimension. If the number of problem tickets has doubled in any month, the user drills down on the severity dimension to get the distribution by severity. These queries can be summarized into the following two user preferences:

1. <Cube(Severity, ProductId), (Count), (Customer(Cust 1, Cust 2)), (Count>5),( )>
2. <GB(Month, Customer(Cust 1, Cust 2)), (Count), ( ), ( ), (Drill down Severity if (Count(Month)>2*Count (Month-1))>

Figure 4:
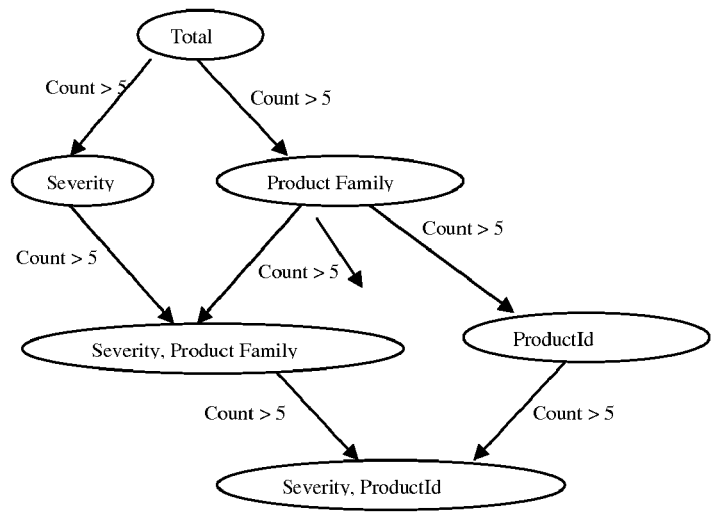
FIG. 4 is a dependency graph for an example embodiment.

The highlights determination will now be worked through based on this set of user preferences. Instead of generating all possible queries based on Severity, Customer, Product and Month, the system generates only the queries that are of interest. The dependency graph 60 for the queries from the cube specification is shown in FIG. 4.

From the above figure, the following queries are generated in the same order:

1. Total Count for Customers 'Cust 1' and 'Cust 2'. The result is shown below:

TABLE 4

| Total Count | 13 |
| --- | --- |

This is a relevant result since the count is greater than 5.

2. Total count by severity for customers 'Cust 1 and 'Cust 2'. The result is shown below:

TABLE 5

| Severity | Count |
| --- | --- |
| SEV1 | 5 |
| SEV2 | 6 |
| SEV3 | 2 |

In this only, SEV1 and SEV2 are relevant since they have a count>5.

3. Count by Severity and Product Family for customers 'Cust 1' and 'Cust 2'. The result is shown below:

TABLE 6

|  | FAM1 | FAM2 |
| --- | --- | --- |
| SEV1 | 3 | 2 |
| SEV2 | 2 | 4 |
| SEV3 | 1 | 1 |

None of the results here are relevant since all counts are less than 5. Further, this results prunes out the query Count by Severity and ProductId, since there cannot be any interesting result at the ProductId level. The counts at ProductId level will be smaller than that at the Product Family level, so they will be lesser than 5.

4. Count by Product Family for customers 'Cust 1' and 'Cust 2'. The results are shown below:

TABLE 7

|  | Product Family | |
| --- | --- | --- |
|  | FAM1 | FAM2 |
| Count | 6 | 7 |

Both these results are relevant.

5. Count by ProductId for customers 'Cust 1' and 'Cust 2'. The results are shown below:

TABLE 8

|  | ProductId | | |
| --- | --- | --- | --- |
|  | PRODUCT1 | PRODUCT2 | PRODUCT3 |
| Count | 6 | 5 | 2 |

PRODUCT1 and PRODUCT2 are relevant since they have counts greater than 5.

From the second user preference, the following query is generated: Count by Month for the customers 'Cust 1' and 'Cust 2'. The result is shown below:

TABLE 9

|  | Month 2 | Month 3 |
| --- | --- | --- |
| Cust 1 | 1 | 6 |
| Cust 2 | 3 | 3 |

From these results, the system can see that number of problem tickets for Cust 1 has more than doubled for Month 3, whereas for Cust 2 it is constant. So the system further selectively drills down on Severity for Cust 1. The result is shown below:

TABLE 10

| Cust 1, Month 3 | Count |
| --- | --- |
| SEV1 | 4 |
| SEV2 | 2 |
| SEV3 | 0 |

The preceding example demonstrates how a system embodying the invention systematically executes only the queries required, and extracts the relevant information from the results.

Hardware Implementation

Figure 5:
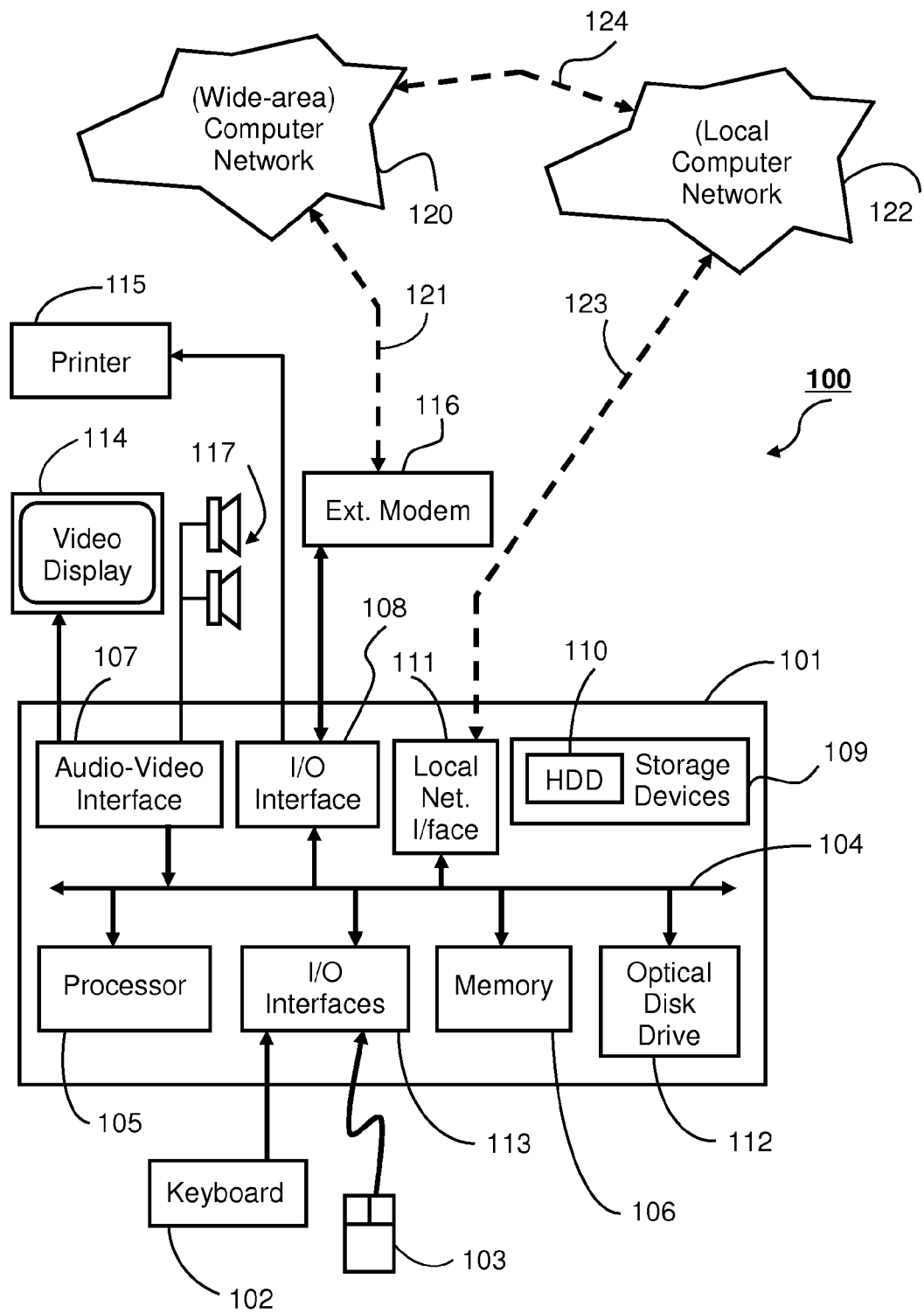
FIG. 5 is a schematic representation of an architecture for implementing an embodiment of the invention.

The method of analyzing an OLAP data set may be implemented using a computer system 100, such as that shown in FIG. 5 wherein the processes of FIGS. 1 and 2 may be implemented as software, such as one or more application programs executable within the computer system 100. In particular, the steps of method of [claim 1 steps] are effected by instructions in the software that are carried out within the computer system 100. The instructions may be formed as one or more code modules, each for performing one or more particular tasks. The software may be stored in a computer readable medium, including the storage devices described below, for example. The software is loaded into the computer system 100 from the computer readable medium, and then executed by the computer system 100. A computer readable medium having such software or computer program recorded on it is a computer program product.

As seen in FIG. 5, the computer system 100 is formed by a computer module 101, input devices such as a keyboard 102 and a mouse pointer device 103, and output devices including a printer 115, a display device 114 and loudspeakers 117. An external Modulator-Demodulator (Modem) transceiver device 116 may be used by the computer module 101 for communicating to and from a communications network 120 via a connection 121. The network 120 may be a wide-area network (WAN), such as the Internet or a private WAN. Where the connection 121 is a telephone line, the modem 116 may be a traditional "dial-up" modem. Alternatively, where the connection 121 is a high capacity (eg: cable) connection, the modem 116 may be a broadband modem. A wireless modem may also be used for wireless connection to the network 120.

The computer module 101 typically includes at least one processor unit 105, and a memory unit 106 for example formed from semiconductor random access memory (RAM) and read only memory (ROM). The module 101 also includes an number of input/output (I/O) interfaces including an audio-video interface 107 that couples to the video display 114 and loudspeakers 117, an I/O interface 113 for the keyboard 102 and mouse 103 and optionally a joystick (not illustrated), and an interface 108 for the external modem 116 and printer 115. In some implementations, the modem 116 may be incorporated within the computer module 101, for example within the interface 108. The computer module 101 also has a local network interface 111 which, via a connection 123, permits coupling of the computer system 100 to a local computer network 122, known as a Local Area Network (LAN). As also illustrated, the local network 122 may also couple to the wide network 120 via a connection 124, which would typically include a so-called "firewall" device or similar functionality. The interface 111 may be formed by an Ethernet™ circuit card, a wireless Bluetooth™ or an IEEE 802.21 wireless arrangement.

The interfaces 108 and 113 may afford both serial and parallel connectivity, the former typically being implemented according to the Universal Serial Bus (USB) standards and having corresponding USB connectors (not illustrated). Storage devices 109 are provided and typically include a hard disk drive (HDD) 110. Other devices such as a floppy disk drive and a magnetic tape drive (not illustrated) may also be used. An optical disk drive 112 is typically provided to act as a non-volatile source of data. Portable memory devices, such optical disks (eg: CD-ROM, DVD), USB-RAM, and floppy disks for example may then be used as appropriate sources of data to the system 100.

The components 105, to 113 of the computer module 101 typically communicate via an interconnected bus 104 and in a manner which results in a conventional mode of operation of the computer system 100 known to those in the relevant art. Examples of computers on which the described arrangements can be practised include IBM-PCs and compatibles, Sun Sparcstations, Apple Mac™ or like computer systems evolved therefrom.

Typically, the application programs discussed above are resident on the hard disk drive 110 and read and controlled in execution by the processor 105. Intermediate storage of such programs and any data fetched from the networks 120 and 122 may be accomplished using the semiconductor memory 106, possibly in concert with the hard disk drive 110. In some instances, the application programs may be supplied to the user encoded on one or more CD-ROM and read via the corresponding drive 112, or alternatively may be read by the user from the networks 120 or 122. Still further, the software can also be loaded into the computer system 100 from other computer readable media. Computer readable media refers to any storage medium that participates in providing instructions and/or data to the computer system 100 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 101. Examples of computer readable transmission media that may also participate in the provision of instructions and/or data include radio or infra-red transmission channels as well as a network connection to another computer or networked device, and the Internet or Intranets including e-mail transmissions and information recorded on websites and the like.

Further Embodiments

Although the invention has been described in what is conceived to be the most practical and preferred embodiments, it is understood that further embodiments are within the scope of the invention. For example, the invention may equally be deployed in a client/server application environment; a distributed software application environment; or in a stand-alone application environment.

CONCLUSION

Various alterations and modifications can be made to the techniques and arrangements described herein, as would be apparent to one skilled in the relevant art.

We claim:

1. A computer-implemented method for analyzing on-line analytical processing (OLAP) data to determine user-relevant information, said method comprising:

inputting a set of user preferences expressed in a user preference specification language to a computer, wherein each user preference includes a subset of dimensions, measures, conditions on measures, a drill down specification that specifies a dimension upon which to drill down, and conditions upon which said drill down occurs;

generating, by said computer, a set of queries, relevant to said user, based on said set of user preferences, said generating a set of queries, relevant to said user, comprising: generating queries sequentially, said generating queries sequentially comprising:

generating a single initial query based on said subset of dimensions, measures, and conditions on measures of each user preference, and further sequentially generating queries based on drilling down according to said drill down specification, while said conditions upon which said drill down occurs are satisfied; or generating a set of queries, one for each combination of cube dimensions that are of interest;

determining, by said computer, how often each of said subset of dimensions and said measures, corresponding to said each user preference, is accessed by said user for a query;

evaluating, by said computer, each of said queries against said OLAP data to give a query result;

determining, by said computer, for each of said evaluated queries, whether said query result is relevant to said user, based on said conditions of said each user preference;

if said query result is not relevant, then preventing, by said computer, subsequent queries from being generated for said evaluating, based on said subset of dimensions, said measures, said conditions on measures, and said drill down specification for said each user preference corresponding to said query result that is not relevant; and if said query result is relevant, then adding, by said computer, said query result to relevant query results that are to be outputted;

based upon said determination, by said computer, of how often said subset of dimensions and said measures are accessed by said user, and said user selected conditions for tagging said queries and query results as interesting, and for drilling down on a selected dimension, modifying, by said computer, said set of user preferences expressed in said user specification language to include said subset of dimensions and said measures that are often accessed by said user, said user selected condition for tagging said queries and query results as interesting, and said selected condition for drilling down; and outputting, by said computer, said relevant query results to said user.

2. The method of claim 1, wherein said conditions on measures comprise any of Boolean conditions, thresholds for outliers, statistical conditions, trends, and comparisons.

3. The method of claim 1, wherein said conditions on measures are represented as a dependency graph.

4. A computer system for analyzing on-line analytical processing (OLAP) data to determine user-relevant information, said system comprising:

a memory that stores an inputted set of user preferences expressed in a user preference specification language,
wherein each user preference includes a subset of dimensions, measures, conditions on measures, and a drill down specification that specifies a dimension upon which to drill down and conditions upon which said drill down occurs;

a processor that:
generates a set of queries, relevant to said user, based on said set of user preferences, wherein generating a set of queries, relevant to said user, comprises:
generating queries sequentially, said generating queries sequentially comprising:
generating a single initial query based on said subset of dimensions, measures, and conditions on measures of each user preference, and
further sequentially generating queries based on drilling down according to said drill down specification, while said conditions upon which said drill down occurs are satisfied; or generating a set of queries, one for each combination of cube dimensions that are of interest;
determines how often each of said subset of dimensions and said measures, corresponding to said each user preference, is accessed by said user for a query,
evaluates each of said queries against said OLAP data to give a query result;
determines, for each of said evaluated queries, whether said query result is relevant to said user, based on said conditions of said each user preference;
if said query result is not relevant, then prevents subsequent queries from being generated for evaluations, based on said subset of dimensions, said measures, said conditions on measures, and said drill down specification for said each user preference corresponding to said query result that is not relevant;
if said query result is relevant, then adds said query result to relevant query results that are to be outputted;

based upon determinations of how often said subset of dimensions and said measures are accessed by said user, and said user selected conditions for tagging said queries and query results as interesting, and for drilling down on a selected dimension, modifying said set of user preferences expressed in said user specification language to include said subset of dimensions and said measures that are often accessed by said user, said user selected condition for tagging said queries and query results as interesting, and said selected condition for drilling down; and outputs said relevant query results to said user.

5. The computer system of claim 4, wherein said conditions on measures comprise any of Boolean conditions, thresholds for outliers, statistical conditions, trends, and comparisons.

6. The system of claim 5, wherein said conditions on measures are represented as a dependency graph.

7. A computer program storage medium readable by a computer, tangibly embodying a computer program of instructions executable by said computer to perform a method for analyzing on-line analytical processing (OLAP) data to determine user-relevant information, said method comprising:

inputting a set of user preferences expressed in a user preference specification language,
wherein each user preference includes a subset of dimensions, measures, conditions on measures, and a drill down specification that specifies a dimension upon which to drill down and conditions upon which said drill down occurs;

generating a set of queries, relevant to said user, based on said set of user preferences, said generating a set of queries, relevant to said user, comprising:
generating queries sequentially, said generating queries sequentially comprising:
generating a single initial query based on said subset of dimensions, measures, and conditions on measures of each user preference, and further sequentially generating queries based on drilling down according to said drill down specification, while said conditions upon which said drill down occurs are satisfied; or generating a set of queries, one for each combination of cube dimensions that are of interest;

determining how often each of said subset of dimensions and said measures, corresponding to said each user preference, is accessed by said user for a query;
evaluating each of said queries against said OLAP data to give a query result;
determining, for each of said evaluated queries, whether said query result is relevant to said user, based on said conditions of said each user preference;
if said query result is not relevant, then preventing subsequent queries from being generated for said evaluating, based on said subset of dimensions, said measures, said conditions on measures, and said drill down specification for said each user preference corresponding to said query result that is not relevant; and
if said query result is relevant, then adding said query result to relevant query results that are to be outputted;

based upon said determination of how often said subset of dimensions and said measures are accessed by said user, and said user selected conditions for tagging said queries and query results as interesting, and for drilling down on a selected dimension, modifying, said set of user preferences expressed in said user specification language to include said subset of dimensions and said measures that are often accessed by said user, said user selected condition for tagging said queries and query results as interesting, and said selected condition for drilling down; and outputting said relevant query results to said user.

8. The computer program storage medium of claim 7, wherein said conditions on measures comprise any of Boolean conditions, thresholds for outliers, statistical conditions, trends, and comparisons.

9. The method of claim 1, wherein if a previous query result, including a common measure, is determined not to be relevant, then omitting said evaluating of a subsequent query including said common measure.

10. The system of claim 4, wherein if a previous query result, including a common measure, is determined not to be relevant, then said processor omits said evaluating of a subsequent query including said common measure.

* * * * *